United States Patent [19]

Fushimi et al.

[11] Patent Number: 5,737,509

[45] Date of Patent: Apr. 7, 1998

[54] METHOD AND APPARATUS FOR RESTORING DATA COHERENCY IN A DUPLEX SHARED MEMORY SUBSYSTEM

[75] Inventors: Masato Fushimi; Toshinori Hiraishi, both of Shizuoka, Japan

[73] Assignee: Fujitsu Limited, Kawasaki, Japan

[21] Appl. No.: 524,580

[22] Filed: Sep. 7, 1995

[30] Foreign Application Priority Data

Jan. 27, 1995 [JP] Japan ................................. 7-011194

[51] Int. Cl.⁶ .................................................. G06F 12/06
[52] U.S. Cl. .................................................. 395/182.03
[58] Field of Search .......................... 395/182.03, 200.08, 395/200.19, 185.07, 468, 474, 475, 481, 489, 490

[56] References Cited

U.S. PATENT DOCUMENTS

| | | | |
|---|---|---|---|
| 5,208,813 | 5/1993 | Stallmo et al. | 371/10.1 |
| 5,222,217 | 6/1993 | Blount et al. | 395/325 |
| 5,235,601 | 8/1993 | Stallmo et al. | 371/40.1 |
| 5,265,235 | 11/1993 | Sindhu et al. | 395/425 |
| 5,333,305 | 7/1994 | Neufield | 395/575 |
| 5,390,187 | 2/1995 | Stallmo et al. | 371/10.1 |
| 5,398,331 | 3/1995 | Huang et al. | 395/575 |
| 5,434,994 | 7/1995 | Shaheen et al. | 395/500 |
| 5,487,160 | 1/1996 | Bemis | 395/441 |
| 5,533,190 | 7/1996 | Binford et al. | 395/182.04 |
| 5,574,851 | 11/1996 | Rathunde | 395/182.05 |

OTHER PUBLICATIONS

Rockhold et al., "Operating System Support For Shared Memory Clusters" Proceed. of the 27th Annual Hawaii Int Conf On System Sciences, Jan. 1994, pp. 86–95.

Farrens et al., "CCHIME: A Cache Coherent Hybrid Interconnected Memory Extension" Parallel Processing Symposium, 1992 Proceedings, 6th Intl., Mar.1992, pp. 573–577.

*Primary Examiner*—Robert W. Beausoliel, Jr.
*Assistant Examiner*—Stephen C. Elmore
*Attorney, Agent, or Firm*—Staas & Halsey

[57] ABSTRACT

A method of restoring data coherency is disclosed, whereby a duplex shared memory subsystem quickly recovers from a failure of one of the duplexed memory pair. A cluster first divides the duplex shared memory subsystem into segments each of which is a unit for copying. After synchronizing itself with other operating clusters, the cluster initiates a coherency restoration process to be performed in cooperation with all other operating clusters, sharing the jobs related to the segments. This results in reducing the time required for the coherency restoration process where the system must operate in an unreliable, coherency-lacking situation.

16 Claims, 12 Drawing Sheets

METHOD AND APPARATUS FOR RESTORING DATA COHERENCY IN A DUPLEX SHARED MEMORY SUBSYSTEM

BACKGROUND OF THE INVENTION

1. Field of the Invention

The present invention relates to a method and apparatus for restoring data coherency in a duplex shared memory subsystem, and more specifically, to a method and apparatus for recovering data coherency when it was lost in a duplex shared memory subsystem which interconnects a plurality of computers (or clusters) in a system.

2. Description of the Related Art

Some conventional computer systems have a large, external memory shared by a plurality of clusters. That external memory is configured as a duplex system and regarded as an extension of the clusters' internal memories. Its data transfer is slower than the internal memories' but faster than that of direct access storage devices, thereby allowing the system to be configured as a high-speed hot standby system. In addition to above-described features, inter-cluster communications are also available via the shared memory subsystem.

A system, where a plurality of clusters are interconnected by such a duplex shared memory subsystem incorporating a pair of external memories, generally has a function of recovering coherency of data stored in the duplex memory subsystem. That is, if a failure has occurred in one of the pair and data coherency is thereby lost, a coherency restoration process reestablishes the duplexity after the memory is recovered from the failure.

To be more specific, if a cluster detects a loss of data coherency while accessing the duplex shared memory subsystem, the cluster is responsible for restoring the data coherency by copying all data from the normal memory to the other memory that has once failed but is now fixed. While the cluster is performing a coherency restoring operation, the memory area under restoration is not accessible, and other clusters will accordingly fall into a wait state when they try to access there.

The above conventional method, however, requires a long time to restore data coherency because one cluster makes a bulk copy after detection of a loss of coherency. Further, it often results in a problem that the shared memory subsystem stays unavailable for the other clusters for an extended period, since the memory is not accessible during the coherency restoring process.

In addition, the cluster which is trying to restore coherency could fail in the middle of its operation. However, the conventional method does not provide any countermeasure to deal with the case.

SUMMARY OF THE INVENTION

Taking the above into consideration, an object of the present invention is to provide a method and apparatus for quickly restoring data coherency in a duplex shared memory subsystem, which resolves a problem of long-time unavailability of the shared memory subsystem.

Another object of the present invention is to provide a method and apparatus for restoring data coherency in a duplex shared memory subsystem, wherein it is possible to continue operations to restore coherency, without losing the result of former operations in vain, even though a cluster has failed during the operations.

To accomplish the above objects, according to the present invention, there is provided a method of restoring data coherency in a duplex shared memory subsystem shared by a plurality of clusters. The method comprises the following four steps of (a), (b), (c), and (d).

In the first step (a), a specific cluster which has detected a loss of data coherency divides each of memories included in the shared memory subsystem into segments. In the second step (b), the specific cluster is synchronized with other clusters being in operation, thereby preventing the other clusters from making access to the shared memory subsystem during a process to restore the data coherency. In the third step (c), the segments are simultaneously copied as specified by the specific cluster. In the last step (d), the specific cluster informs the other clusters of desynchronization.

To accomplish the above objects, there is also provided an apparatus for restoring data coherency in a duplex shared memory subsystem. The apparatus comprises the following four means and two tables.

Coherency-loss detecting means detects a loss of data coherency informed from the duplex shared memory subsystem. Coherency restoration means creates information necessary to restore the data coherency. Synchronization control means controls synchronization with other clusters in operation. Copying means makes copies within the duplex shared memory subsystem under the synchronization so as to restore the data coherency. A copying job sharing table stores associative information which is created by the coherency restoration means and referred to by the copying means in a copying job. The associative information associates the clusters with memory areas to be copied. A synchronization control table, coupled to the synchronization control means, coordinates interactions of: synchronization request to the other clusters, completion of synchronization from the other clusters, indication of in-synchronization status, completion report of coherency restoration jobs from the other clusters, and desynchronization request to the other clusters.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention is outlined as follows.

Figure 1:
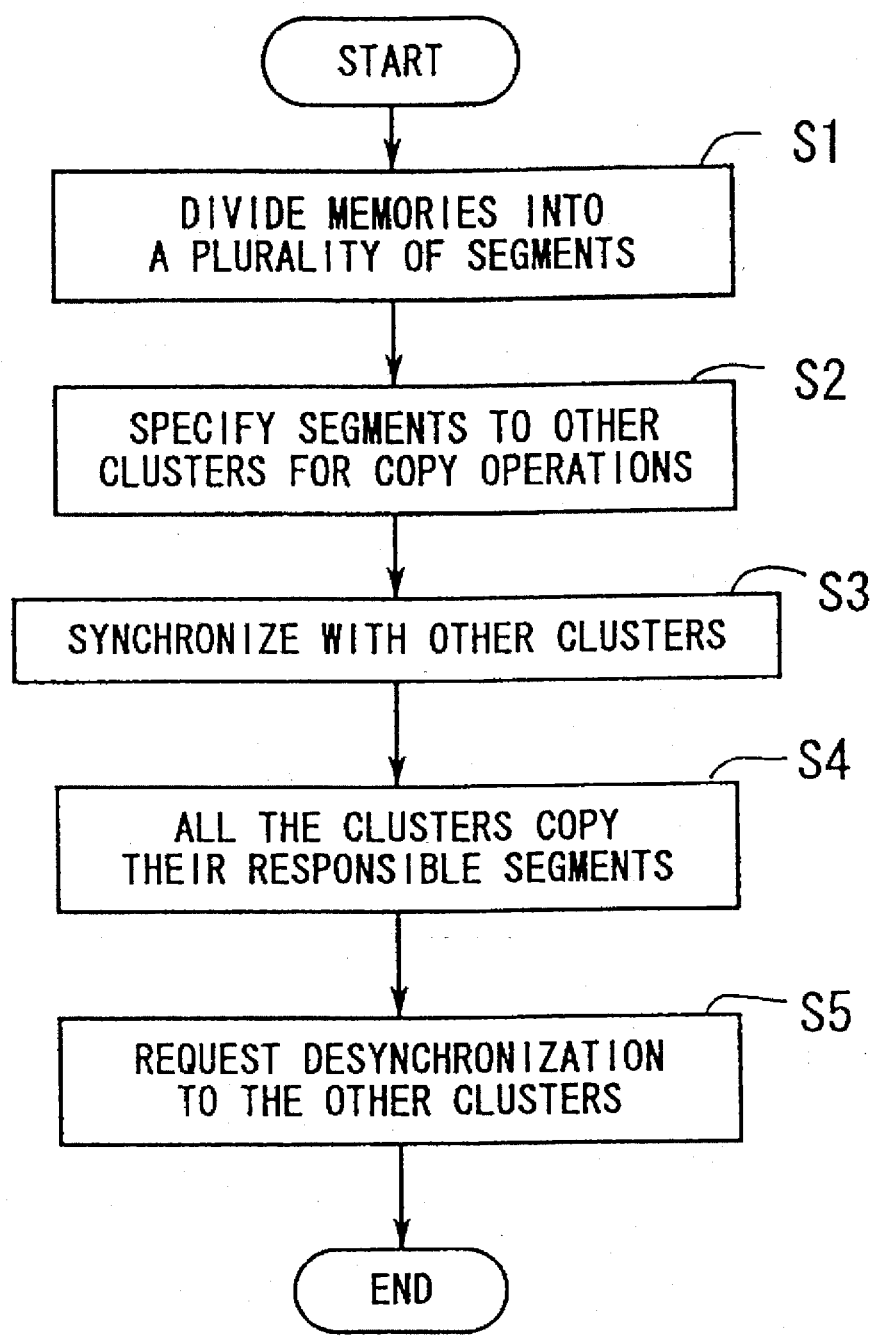
FIG. 1 is a flowchart showing a method of restoring data coherency in a duplex shared memory subsystem according to the present invention.

FIG. 1 is a flowchart showing a method of restoring data coherency in a duplex shared memory subsystem according to the present invention.

This flowchart shows that the method comprises the following steps S1 through S5. In a system with a duplex memory which contains a pair of memories and is shared by a plurality of clusters, those steps are to be taken to reestablish the lost duplexity (i.e., to restore data coherency) when a specific cluster detected a failure in a half of the paired memories and the failure was then fixed.

[Step S1] The memories are divided into a plurality of segments.

[Step S2] A specific cluster specifies each of other clusters which segment it should copy.

[Step S3] That specific cluster synchronizes itself with the other clusters to inhibit the other clusters from access to the shared memory subsystem during a coherency restoration process.

[Step S4] All the clusters copy their responsible segments at a time and thereby restore the data coherency.

[Step S5] The specific cluster confirms that all the clusters have finished their copying jobs, then informs the other clusters of desynchronization, and finally terminates the process.

As such, the method of restoring data coherency of the present invention provides substantial reduction of time required for a coherency restoration process, because the memory area of the shared memory subsystem is divided into small segments and all the clusters simultaneously copy their segments in charge.

Figure 2:
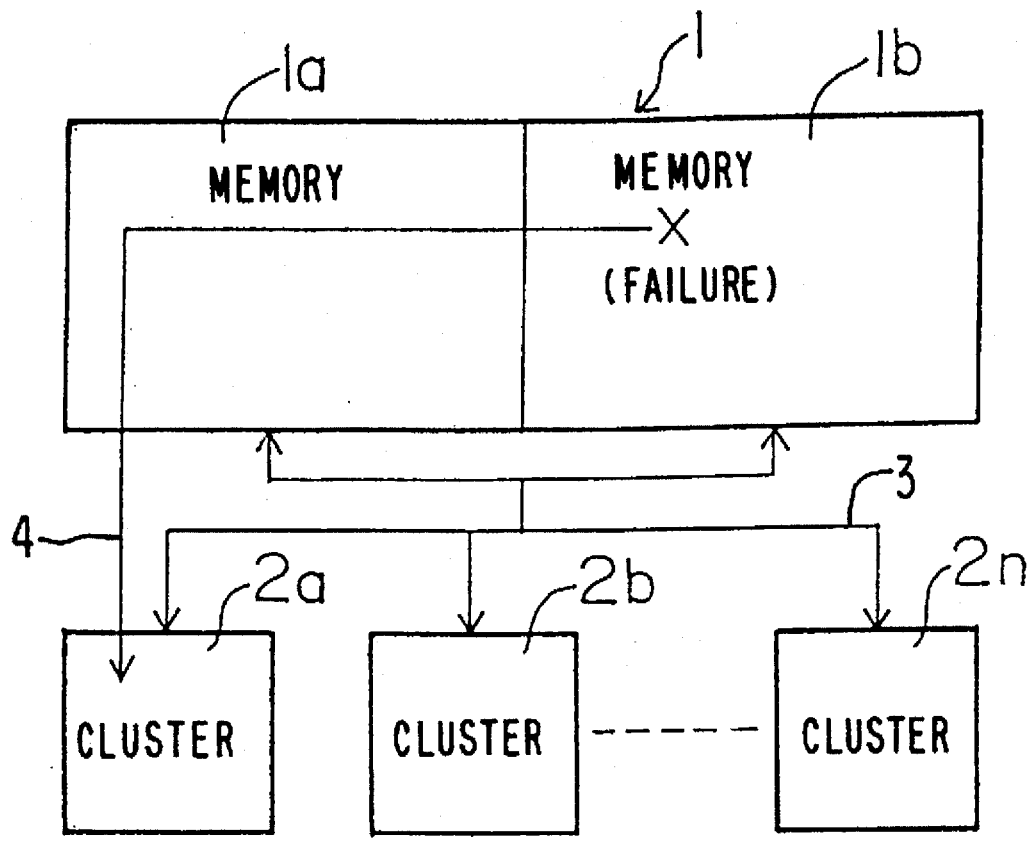
FIG. 2 illustrates how a loss of data coherency is detected in a shared memory subsystem.

FIG. 2 illustrates how a loss of data coherency is detected in a shared memory subsystem. In FIG. 2, a shared memory subsystem 1 consists of a pair of memories 1a and 1b which contain exactly the same contents, thus organizing a duplex memory subsystem. A plurality of clusters 2a and 2b through 2n are connected to the shared memory subsystem 1 via connection paths 3. When data are written to the shared memory subsystem 1, the both memories 1a and 1b are accessed to write the data. If one of the memories, the memory 1b for example, has failed during that duplexed write operation, the failure is signaled to a specific cluster 2a, for example. FIG. 2 shows such a problem situation, where the symbol "X" represents the memory failure and an arrow 4 extending from there to the cluster 2a indicates the flow of the failure signal. Note that this unsuccessful write operation indicates a loss of data coherency between the two memories. After that, the failed memory is fixed by some appropriate process and a coherency restoration process then begins so as to recover the duplexity of the shared memory subsystem 1.

FIGS. 3(A), 3(B), and 3(C) are diagrams to show how to restore data coherency.

For the first step in the coherency restoration process, each of the memories 1a and 1b is divided into a plurality of small segments as shown in FIG. 3(A), each of which segments will be treated as one unit of copying. In this embodiment, the number of segments is set to "n" which is equal to the number of clusters. The cluster 2a, which has detected a loss of data coherency, initiates synchronization with other clusters 2b–2n (i.e., clusters 2b through 2n). The term "synchronization" simply indicates that the cluster 2a posts a messages (synchronization request), by inter-cluster communications, to the other clusters 2b–2n not to make access to the shared memory subsystem 1 until the cluster 2a permits it again. The cluster 2a requests the synchronization to the other clusters in that way, and subsequently, the other clusters 2b–2n return messages upon completion of their synchronization operations. While the clusters are in synchronization, business application programs running on each cluster are suspended from access to the shared memory subsystem 1, and their normal processing is thereby stopped.

On reception of the completion messages from the other clusters 2b–2n, the cluster 2a commands them to start a coherency restoration process. As FIG. 3(B) shows, the cluster 2a and the other clusters 2b–2n cooperate in copying the memory data in such a way that each cluster takes charge of a copying operation of each segment assigned thereto. FIG. 3(B) shows that the clusters 2a–2n simultaneously transfer the segment data from the memory 1a to the memory 1b as indicated by dashed lines 5a–5n, thus making a complete copy from the segments of the memory 1a to the corresponding segments in the memory 1b. Since all the clusters execute those copying operations at a time, the coherency restoration process to recover duplexity will be finished in a short time.

Figure 3:
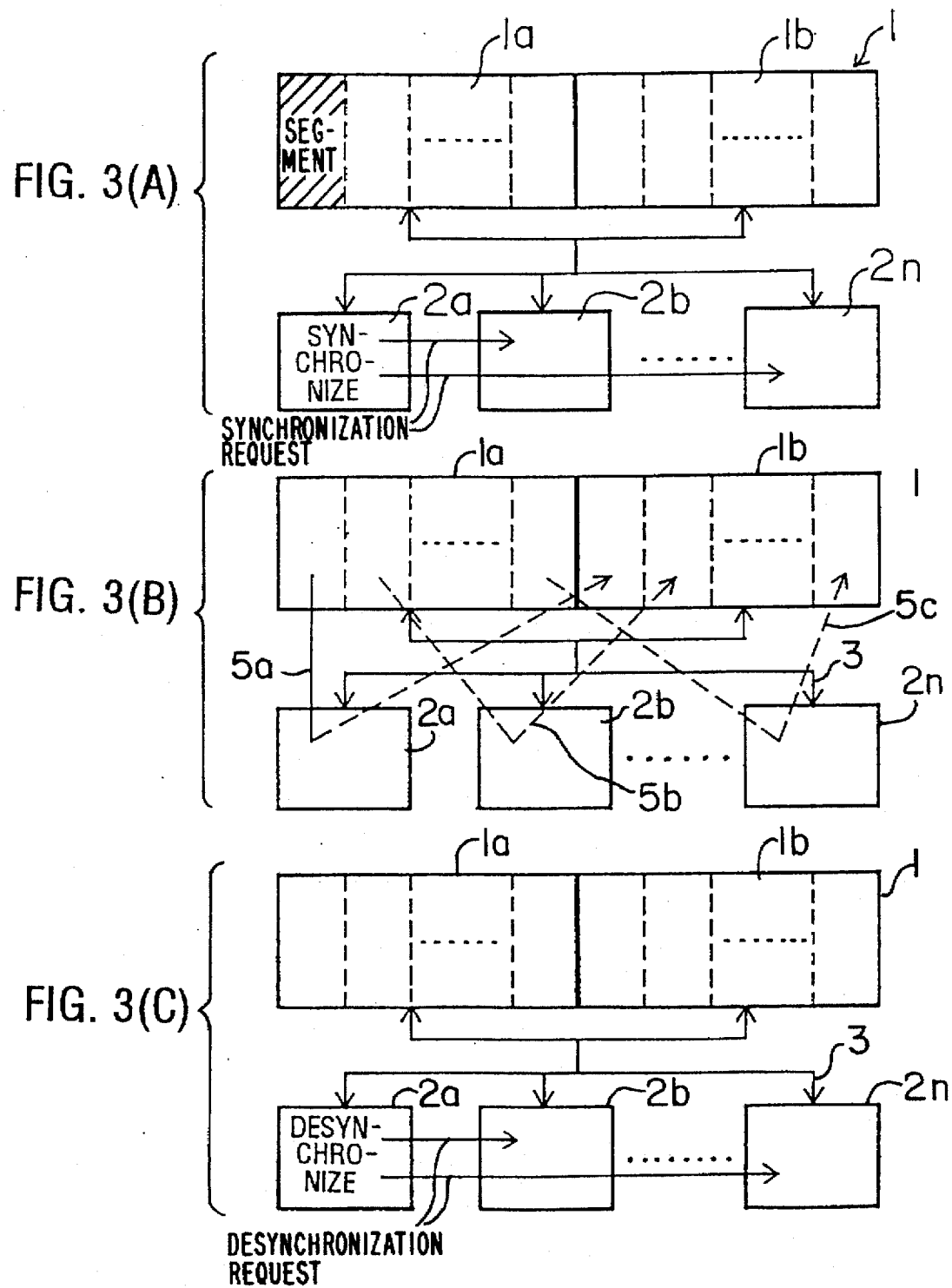
FIGS. 3(A), 3(B), and 3(C) are diagrams showing how to restore data coherency.

Each of the other clusters 2b–2n sends a message to the cluster 2a upon in completion of the process. The cluster 2a then posts a message (desynchronization request), as shown in FIG. 3 (C), to the other clusters 2b–2n to desynchronize themselves, thereby permitting them to have access to the shared memory subsystem 1. The business application programs will accordingly restart their normal execution.

Next, a specific embodiment of the present invention will be described below with reference to the drawings.

Figure 4:
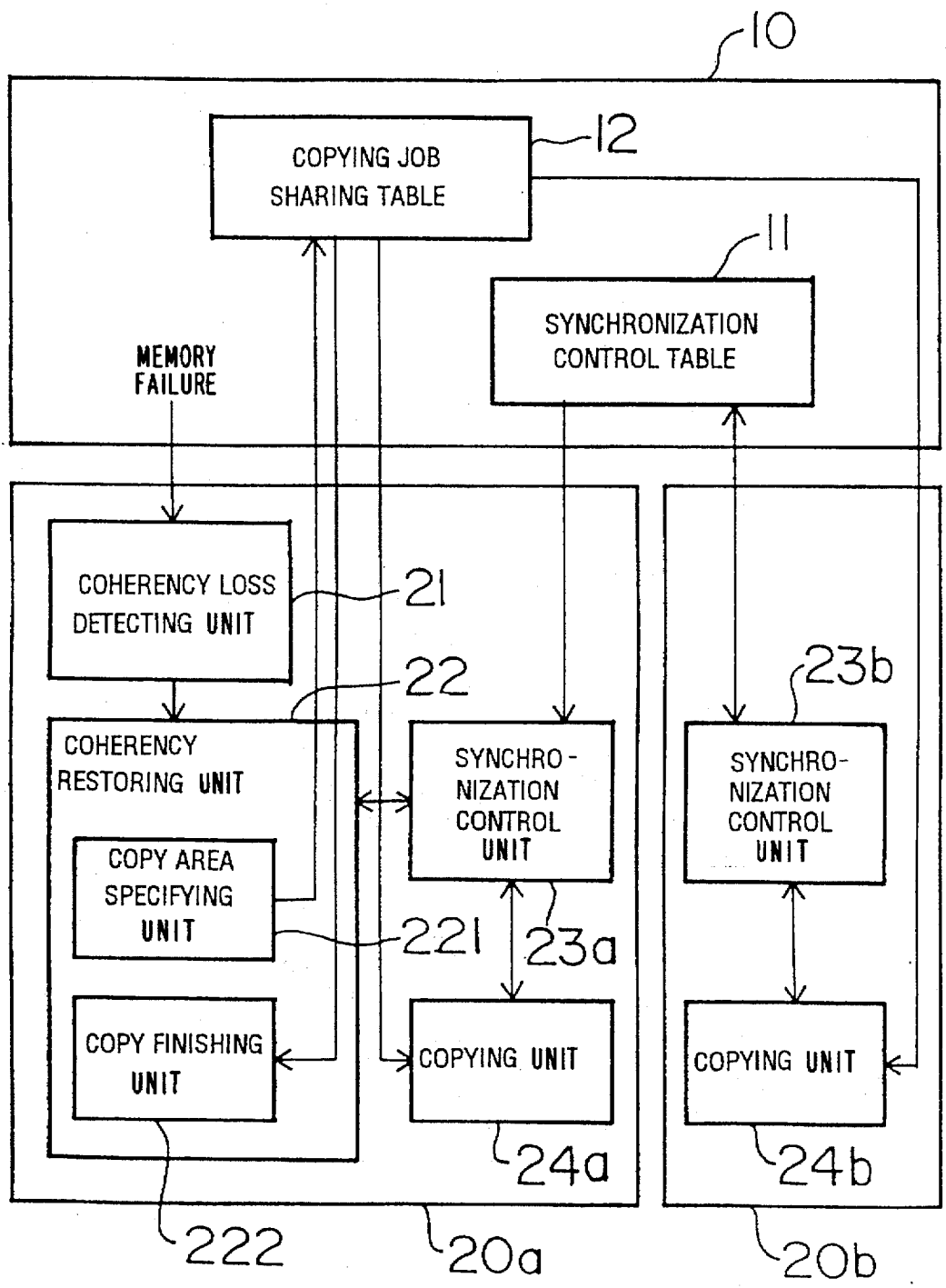
FIG. 4 is a schematic diagram showing a structure of a system to which a coherency restoration process is applied.

FIG. 4 is a schematic diagram showing the structure of a system to which a coherency restoration process is applied. FIG. 4 illustrates that the system incorporates a system storage unit (SSU) 10 as an external shared memory. In reality, the shared memory is duplexed with a pair of such storage units. A plurality of clusters 20a and 20b are connected to the system storage unit 10. The cluster 20a plays a role of a main cluster that is responsible for detection of a loss of data coherency in the system storage unit 10 and also for its restoration. Although there are many other clusters, in general, the cluster 20b acts on behalf of such clusters in the shown example. Although the cluster 20b looks simpler than the cluster 20a in FIG. 4, it actually has the same internal structure as the cluster 20a so that any cluster can be a main cluster.

The system storage unit 10 stores a synchronization control table 11 which the clusters use for inter-cluster synchronization, and a copying job sharing table 12 which defines the segments to be copied by the clusters.

The main cluster 20a comprises a coherency loss detecting unit 21 for detecting a loss of data coherency in the system storage unit 10, coherency restoration unit 22, a synchronization control unit 23a, and a copying unit 24a. The coherency restoration unit 22 comprises a copy area specifying unit 221 and a copy finishing unit 222. The cluster 20b, which works as a cluster other than the main cluster, comprises at least a synchronization control unit 23b and a copying unit 24b.

When the coherency loss detecting unit 21 in the cluster 20a detects a memory failure in the system storage unit 10, the copy area specifying unit 221 of the coherency restoration unit 22 writes job-sharing information into the copying job sharing table 12 in the system storage unit 10. That job-sharing information is for dividing the memory area of the system storage unit 10 into a plurality of segments for copying and assigning them to each of the clusters. The synchronization control unit 23a requests the cluster 20b, which is subject to the synchronization, to synchronize itself through the synchronization control table 11. Confirming the synchronization request, the cluster 20b acknowledges its reception of the request back to the cluster 20a via the synchronization control table 11. The synchronization control unit 23a commands the copying unit 24a to initiate a copying process and also requests the copying unit 24b in the other cluster 20b to initiate a copying process. The two copying unit 24a and 24b look up the copying job sharing table 12 and copy the segments which are assigned to each of them. When the copy is completed, its result is written back to the copying job sharing table 12. After confirming that all the clusters have completed their processes, the copy finishing unit 222 in the coherency restoration unit 22 requests the synchronization control unit 23a to desynchronize the clusters. Through the synchronization control table 11, the synchronization control unit 23a informs all the clusters of desynchronization to stop being synchronized.

Figure 5:
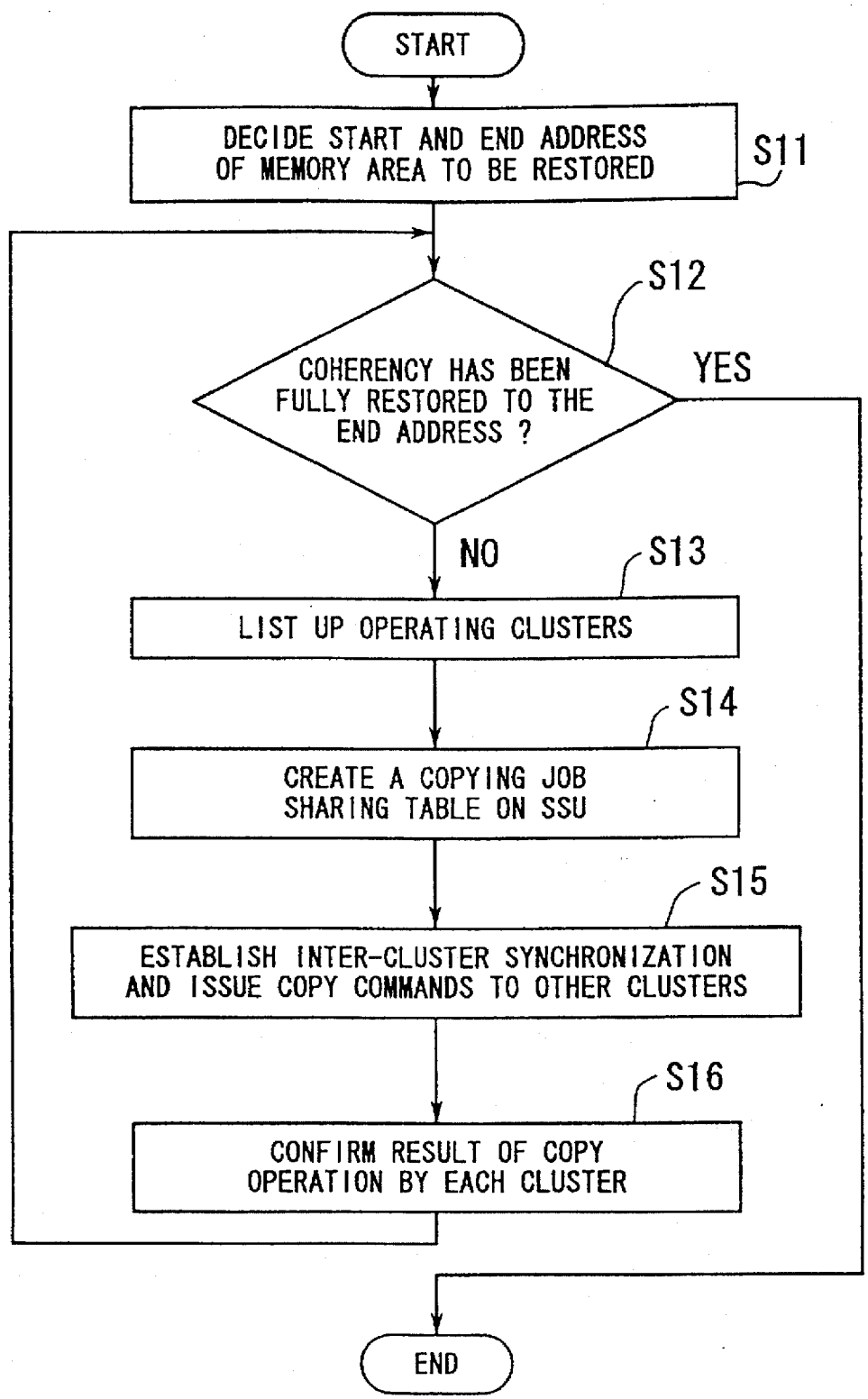
FIG. 5 is a flowchart showing a coherency restoration process in a main cluster.

FIG. 5 is a flowchart showing a coherency restoration process in the main cluster.

Assume that the cluster 20a has detected a failure of the system storage unit 10 via the coherency loss detecting unit 21, and then the system storage unit 10 is repaired by some appropriate unit. After that, a coherency restoration process starts with respect to the system storage unit 10 that has been repaired. The flowchart in FIG. 5 shows the following six steps to restore the data coherency.

[Step S11] Start address and end address are decided to define a memory area which is subjected to the coherency restoration process. The whole memory area of the system storage unit 10 is usually subjected to it.

[Step S12] It is determined whether the coherency has been fully restored or not to the end address. If it is found that the process has finished to the end address, the process will be terminated. If not, the step proceeds to Step S13.

[Step S13] All the operating clusters are identified. That is, the clusters in operation can recognize each other by inter-cluster communications via the shared memory subsystem, and the operating clusters are thereby determined.

[Step S14] A copying job sharing table 12 is created to be used to specify which segment of the memory area will be copied by each cluster. The copying job sharing table 12 thus created is stored in the other system storage unit (SSU) which has not failed.

[Step S15] After establishment of inter-cluster synchronization, copying commands are issued to the clusters. The details of how to make the inter-cluster synchronization will be described later.

[Step S16] The progress is totally checked with a result status of the copy operation which each cluster uploads to the copying job sharing table 12.

This process flow particularly involves Step S12 for executing the coherency restoration process on a step-by-step basis. The reason is as follows. The method shown in FIG. 3 is such that the shared memory subsystem is divided by the number of operating clusters and the coherency restoration process is performed at a time. With that method, however, the clusters will be occupied too long for the coherency restoration process if the memory size is large or the number of available clusters is reduced. On the other hand, the method of FIG. 5 gives a smaller size to the memory segments at step S14 so as to limit the unit of copying operation by each cluster.

Figure 6:
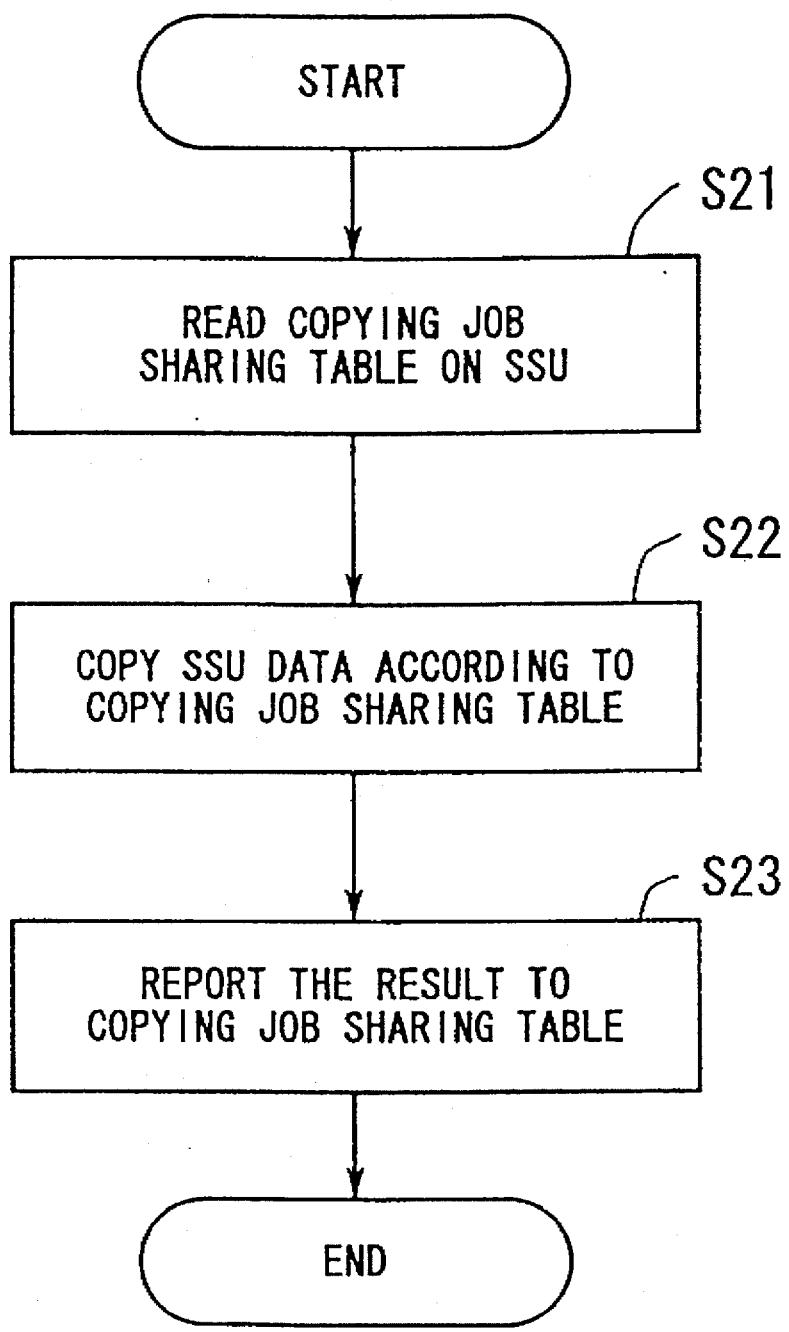
FIG. 6 is a flowchart showing a coherency restoration process in the other clusters.

FIG. 6 is a flowchart showing a coherency restoration process in the other clusters, which comprises the following three steps.

[Step S21] On reception of a request for copy from the main cluster, the other clusters read the copying job sharing table on the system storage unit (SSU).

[Step S22] According to the information in the copying job sharing table, the other clusters copy data in their assigned segments in one system storage unit to those in the other system storage unit which has been repaired.

[Step S23] Upon completion of the copying operations, the other clusters report the result to the copying job sharing table.

Next, the inter-cluster communications performed in step S15 of FIG. 5 will be explained in detail. The explanation starts with a synchronization control table used to establish the synchronization.

Figure 7:
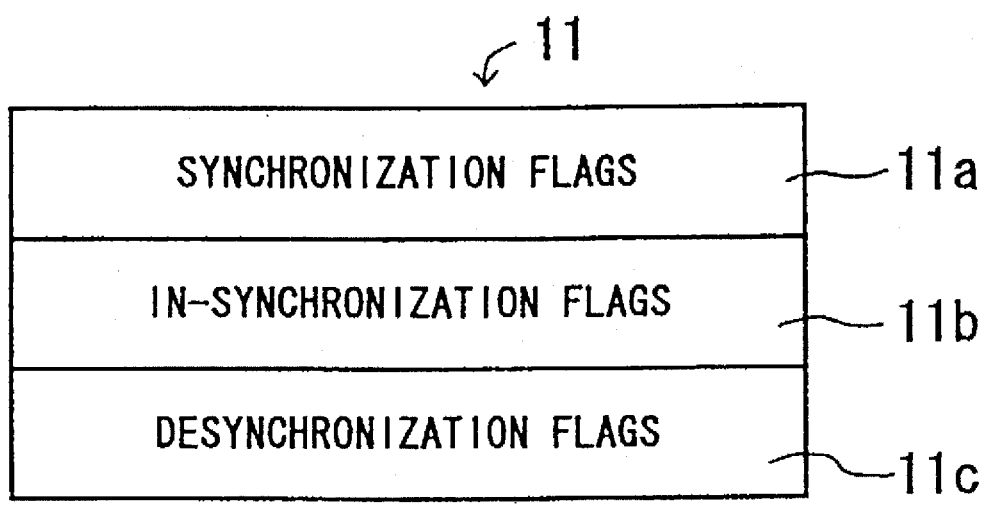
FIG. 7 illustrates a structure of a synchronization control table.

FIG. 7 illustrates a structure of the synchronization control table.

The synchronization control table 11 includes synchronization flags 11a, in-synchronization flags 11b, and desynchronization flags 11c. Those three sets of flags have the same data structure. That is, they are arrays of 1-bit flags, each of which is associated with each cluster.

Figure 8:
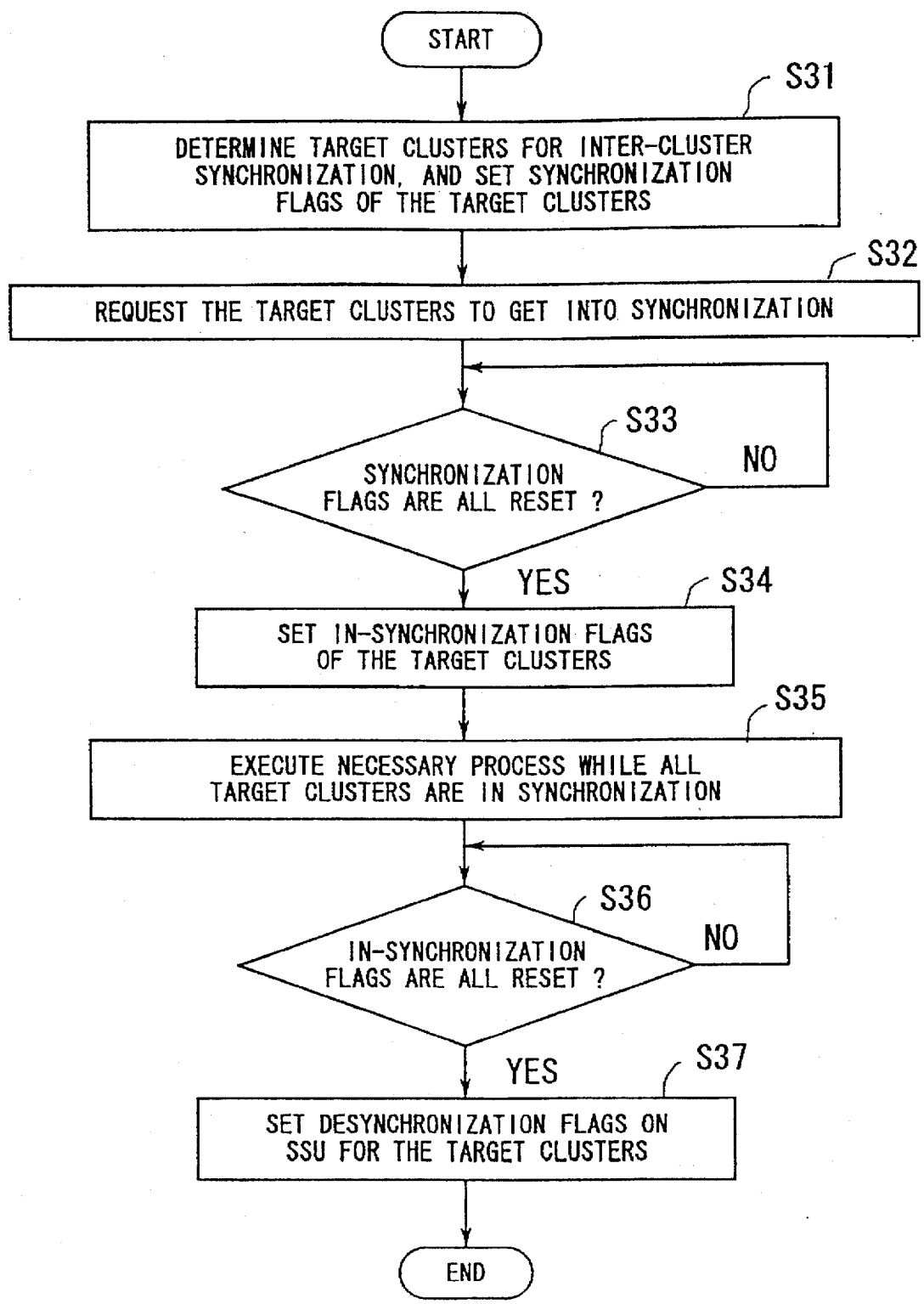
FIG. 8 is a flowchart showing a process in a cluster requesting inter-cluster synchronization.

FIG. 8 is a flowchart showing a process in a cluster requests an inter-cluster synchronization, which cluster is called a requesting cluster. The flowchart shows that the process comprises the following seven steps.

[Step S31] The requesting cluster determines target clusters to be subjected to the inter-cluster synchronization, selecting from clusters connected to the shared memory subsystem, and then sets the synchronization flags, in the system storage unit, corresponding to the target clusters.

[Step S32] The requesting cluster requests the target clusters to get into synchronization.

[Step S33] While the target clusters reset their corresponding synchronization flags to indicate an acknowledgment of the request for synchronization, the requesting cluster enters a loop for waiting until all the synchronization flags get reset and all the target clusters have acknowledged the request.

[Step S34] Recognizing that all the synchronization flags are reset, the requesting cluster sets the in-synchronization flags corresponding to the target clusters in order to inform them of the completion of the inter-cluster synchronization.

[Step S35] The clusters execute necessary jobs (i.e., jobs for the coherency restoration process) while all target clusters are in synchronization.

[Step S36] While the target clusters reset the corresponding in-synchronization flags upon completion of the jobs assigned thereto, the requesting cluster enters a loop where it waits until all the in-synchronization flags get reset.

[Step S37] When the in-synchronization flags are all reset, indicating that all the required jobs have successfully finished, the requesting cluster sets desynchronization flags for the target clusters so as to inform them of desynchronization, thus terminating the inter-cluster synchronization.

Incidentally, in case that a cluster is configured as a multi-processor system, it is necessary to synchronize the processors within the cluster before starting the inter-cluster synchronization.

Figure 9:
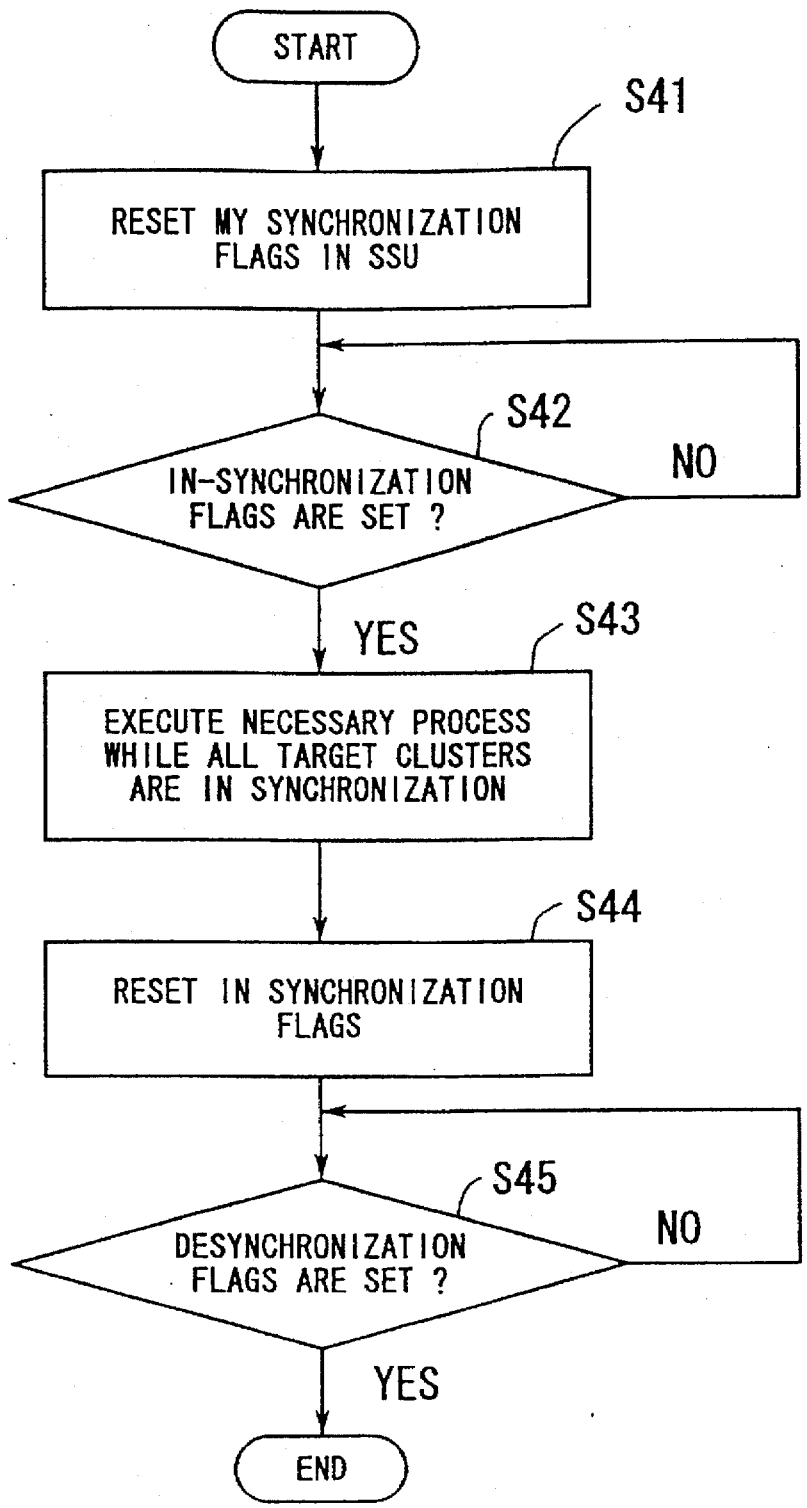
FIG. 9 is a flowchart showing a process in target clusters subjected to inter-cluster synchronization.

In contrast to the requesting cluster's process flow, FIG. 9 shows a process flowchart of a group of clusters targeted to the inter-cluster synchronization (i.e., the target clusters). The flowchart shows that the process comprises the following five steps.

[Step S41] In response to the request from the requesting cluster to get into synchronization (as in Step S32 described above), the target clusters reset the synchronization flags in the system storage unit so as to inform the requesting cluster of an acknowledgment to the request.

[Step S42] While the requesting cluster sets the in-synchronization flags corresponding to the target clusters to let them know the establishment of the inter-cluster synchronization (as described in step S34), the target clusters enter into a loop for waiting for the corresponding in-synchronization flag to be set.

[Step S43] Each of the target clusters executes its necessary job while all target clusters are in synchronization. That is, it performs a coherency restoration process as shown in FIG. 6.

[Step S44] The target clusters reset their corresponding in-synchronization flags upon completion of the jobs assigned thereto.

[Step S45] The target clusters wait for a request coming from the requesting cluster to end the synchronization, by monitoring the corresponding desynchronization flags. When the requesting cluster sets the desynchronization flags of the corresponding target clusters, the target clusters recognize the set flags as a request for desynchronization and thereby terminate the synchronization.

Figure 10:
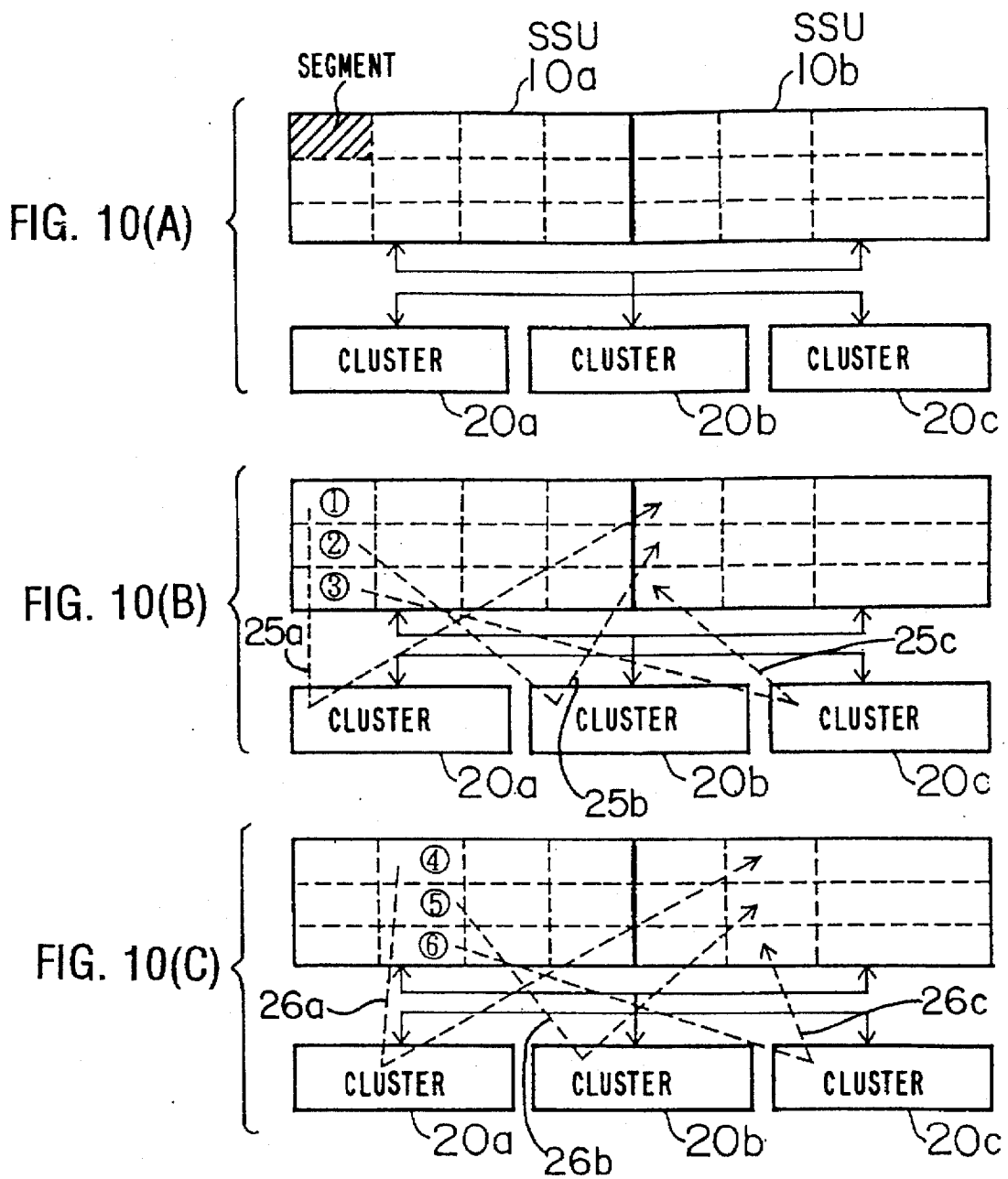
FIGS. 10(A), 10(B), and 10(C) illustrate a method to perform a coherency restoration process in a plurality of steps.

FIGS. 10(A), 10(B), and 10(C) illustrate a method to restore data coherency in multiple steps.

In this multi-step coherency restoration method, a restoration segment size appropriate for a restoration operation to be carried out by one cluster is first decided, and the memories involved in a pair of system storage units 10a and 10b are divided by that restoration segment size as shown in FIG. 10(A). In this preferred embodiment, the restoration segment size, or one unit of copying operation, is set to be four megabytes. Because it is assumed here that the system storage unit 10b has once failed and lost its data coherence, the data will be copied from the system storage unit 10a to the system storage unit 10b in coherency restoration process. To simplify the explanation, only three clusters 20a, 20b and 20c are assumed to be in operation.

In the first coherency restoration step, the clusters 20a, 20b and 20c copy the segments ①, ② and ③, respectively, in the system storage unit 10a to the corresponding segments in the system storage unit 10b, sharing the copying jobs as indicated by dash lines 25a–25c in FIG. 10(B). In the second coherency restoration step, as shown in FIG. 10(C), the clusters 20a, 20b and 20c similarly copy the segments ④, ⑤ and ⑥, respectively, in the system storage unit 10a to the corresponding segments in the system storage unit 10b as indicated by dashed lines 26a–26c. The remaining segments will be also copied in the same manner.

The coherency restoration steps in this preferred embodiment proceed every five seconds, for example. The clusters 20a, 20b and 20c, however, are free from synchronization during the interval period between the consecutive steps, and they are therefore allowed to make access to the shared memory subsystem. Their business application programs seemingly continue to run without substantial loss of performance, because the coherency restoration process does not interrupt them for a long time.

The following explanation describes how to continue a coherency restoration process in case that a failure has occurred in a cluster in the middle of the process.

Figure 11:
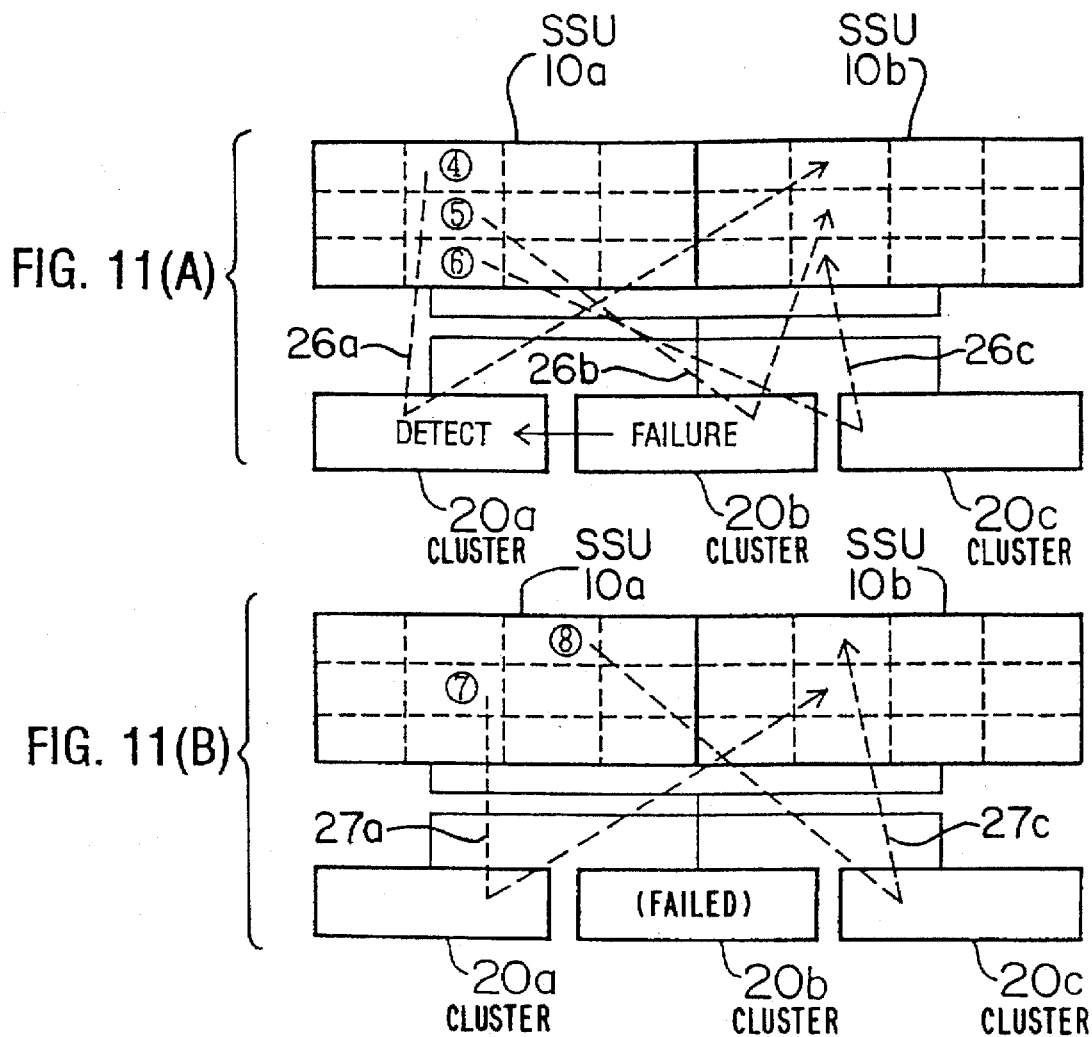
FIGS. 11(A) and 11(B) illustrate a process in case that a failure occurred in a cluster while restoring data coherency.

FIGS. 11(A) and 11(B) illustrate a process in case that a cluster failed while restoring data coherency. More specifically, it is assumed that the cluster 20b failed while the clusters were copying data as indicated by dashed lines 26a–26c in FIG. 10(C).

FIG. 11(A) shows that the cluster 20a detects the failure of the cluster 20b. The failed cluster 20b can no longer share the further process. In addition, it may have been failed to complete copying of the segment ⑤ that it was just working on. At the next coherency restoration step, the cluster 20a divides the remaining memory area, including the segment ⑤, which was under control of the cluster 20b at the time of the failure, and creates a new copying job sharing table for the clusters 20a and 20c. In the example, a newly defined segments ⑦ and ⑧ are to be copied to the associated places in the system storage unit 10b by the clusters 20a and 20c, respectively, as indicated by dashed lines 27a and 27c. The two clusters 20a and 20c will continue copying of the remaining memory area after that. As such, even though a cluster failed during the coherency restoration process, the segments that have been already finished are still valid.

Figure 12:
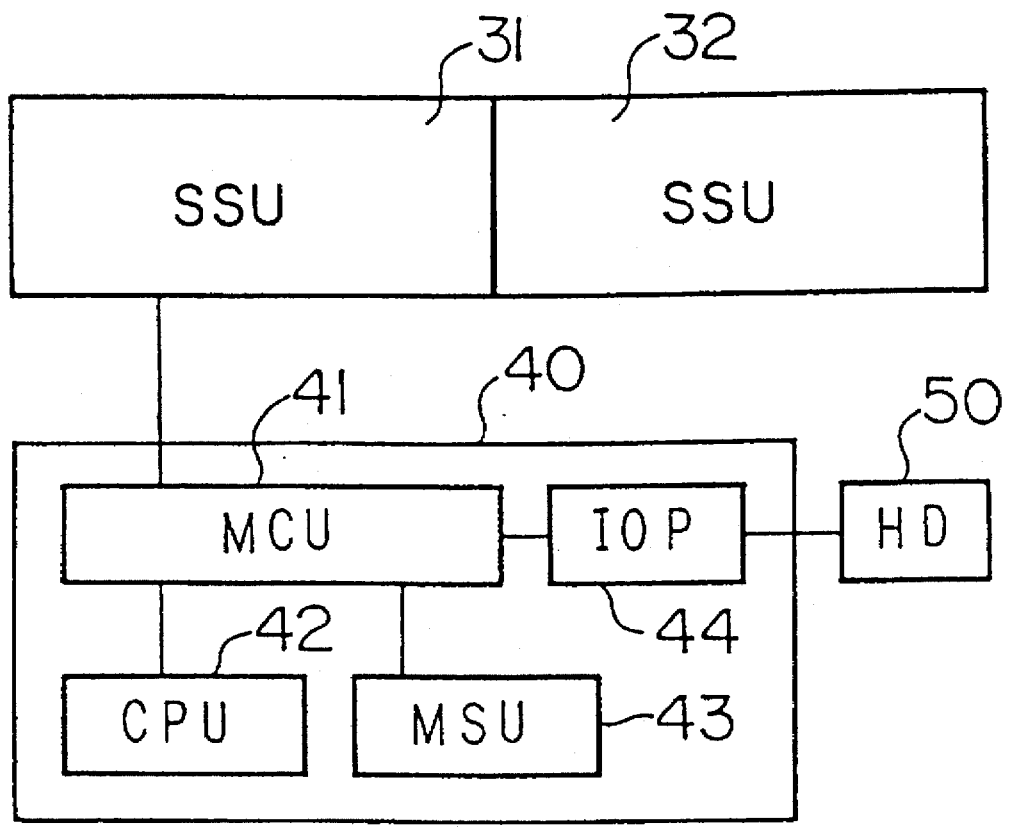
FIG. 12 is a block diagram showing a hardware configuration a specific embodiment of the present invention.

FIG. 12 is a block diagram showing a hardware configuration of a specific embodiment of the present invention.

Since the clusters connected to the system storage units have nearly the same configuration, the following will only explain one typical cluster.

Duplex system storage units (SSUs) 31 and 32 constitute an external shared memory subsystem. Those system storage units 31 and 32 are connected to a memory control unit (MCU) 41 incorporated in a cluster 40. This memory control unit 41 links to a processor (CPU) 42, a main storage unit (MSU) 43 and an I/O processor (IOP) 44 which interfaces with an external storage device, such as a hard disk (HD) 50. Many clusters are actually implemented as multi-processor systems, where a plurality of processors are combined with the memory control unit 41. In that case, a plurality of main storage units are connected to the memory control unit 41.

The hard disk 50 stores an operating system and business application programs as well as a program for coherency restoration process.

As explained above, according to the present invention, a duplex shared memory subsystem is divided into segments each of which is a unit of copying, and operating clusters share the jobs in a coherency restoration process, thus allowing a quick recovery. This method reduces the time during which the system must operate in an unreliable, coherency-lacking situation and improves the system's reliability.

In addition, by reducing the unit amount of copy and gradually executing the coherency restoration process in a plurality of steps, the clusters are free from a long-time occupation for the coherency restoration process.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of restoring data coherency in a duplex shared memory subsystem shared by a plurality of clusters, the duplex shared memory system including first and second memories accessible by the plurality of clusters, the method comprising the steps of:
   (a) causing a specific cluster, which has detected a loss of data coherency, to divide each of the first and second memories into a plurality of segments, the plurality of segments of the first memory corresponding, respectively, to the plurality of segments of the second memory;
   (b) synchronizing the specific cluster with other clusters, thereby preventing the other clusters from making access to the duplex shared memory subsystem during a process to restore the data coherency;
   (c) causing the specific cluster to assign the plurality of segments of the first memory to the plurality of clusters;
   (d) simultaneously copying data from the segments of the first memory to the corresponding segments of the second memory by the plurality of clusters according to the assignment by the specific cluster in said step (c); and
   (e) causing the specific cluster to inform the other clusters of desynchronization.

2. A method according to claim 1, wherein said step (a) comprises the substeps of:
   (a1) identifying clusters which are operating in connection with the duplex shared memory subsystem, and
   (a2) dividing each of the first and second memories into a number of segments equal to the number of clusters identified in said step (a1).

3. A method according to claim 1, which repeats said steps (a), (b), (c), (d) and (e) until the data coherency of the duplex shared memory subsystem is completely restored, wherein said step (a) divides each of the first and second memories into segments which are each small enough to be a unit of copying.

4. A method according to claim 3, which restarts from said step (a) in case that one of the clusters has failed while said step (a), (b), (c), (d) or (e) is being performed, wherein said step (a) divides each of the first and second memories excluding a memory area which assures that the process to restore the data coherency has already finished.

5. A method according to claim 1, wherein
   in said step (c), the specific cluster is caused to assign the plurality of segments of the first memory to the plurality of clusters by using a copying job sharing table which defines the plurality of segments of the first memory to be copied by the plurality of clusters, and
   in said step (d), each of the plurality of clusters carries out the substeps of
   (d1) copying data in a segment of the first memory assigned to the respective cluster to the corresponding segment in the second memory by consulting the copying job sharing table and
   (d2) reporting a result status of the copying performed in said substep (d1) to the specific cluster by writing the result status into the copying job sharing table.

6. A method according to claim 1, wherein the step (b) comprises the substeps of:
   (b1) causing the specific cluster to set synchronization flags in a synchronization control table, the synchronization flags corresponding, respectively, to the other clusters and causing a synchronization request to be sent to the other clusters,
   (b2) causing the other clusters to reset the synchronization flags after acknowledgment of the synchronization request, and
   (b3) causing the specific cluster to confirm that all the synchronization flags are reset and to then set in-synchronization flags in the synchronization control table, the in-synchronization flags corresponding, respectively, to the other clusters, the setting of the in-synchronization flags thereby informing the other clusters of establishment of synchronization,
   the step (c) causes the other clusters to reset the in-synchronization flags in the synchronization control table after completion of copying the segments, and
   the step (e) causes the specific cluster to confirm that all the in-synchronization flags are reset and to then set desynchronization flags in the synchronization control table, the desynchronization flags corresponding, respectively, to the other clusters, the setting of the desynchronization flags causing the other clusters to be informed of termination of the process to restore the data coherency.

7. A system for restoring data coherency in a duplex shared memory subsystem shared by a plurality of clusters, the duplex shared memory subsystem including first and second memories accessible by the plurality of clusters, comprising:
   coherency-loss detecting means, disposed in at least one of the clusters, for detecting a loss of data coherency in the duplex shared memory subsystem;
   coherency restoration means, disposed in at least one of the clusters, for creating information necessary to restore the data coherency;
   synchronization control means, disposed in each cluster, for controlling synchronization with other clusters to inhibit applications running on the clusters from accessing the duplex shared memory subsystem;
   copying means, disposed in each cluster, for copying within the duplex shared memory subsystem under the control of said synchronization control means so as to restore the data coherency;
   a copying job sharing table, disposed in the shared memory subsystem, for storing information created by the coherency restoration means and referred to by the copying means in a copying job, wherein
   each of the first and second memories is divided into a plurality of segments, the plurality of segments of the first memory corresponding, respectively, to the plurality of segments of the second memory,
   the information stored in the copying job sharing table indicates a specific segment of the first memory to be copied by said copying means of each cluster; and
   a synchronization control table, disposed in the shared memory subsystem, allows said synchronization control means to performs interactions with the other clusters, the interactions including synchronization request to the other clusters, completion of synchronization from the other clusters, indication of in-synchronization status, completion report of coherency restoration jobs from the other clusters, and desynchronization request to the other clusters.

8. A system according to claim 7, wherein said coherency restoration means comprises:

copy area specifying means for writing the information into the copying job sharing table; and copy finishing means for requesting the synchronization control means to initiate desynchronization in response to result status of the copying job indicated in the copying job sharing table.

9. A method for restoring data coherency between first and second memories which have lost data coherency, the first and second memories being accessible by a plurality of clusters, the method comprising the steps of:

dividing the first and second memories into a plurality of segments, the plurality of segments of the first memory corresponding, respectively, to the plurality of segments of the second memory;

assigning each segment of the plurality of segments of the first memory to a respective cluster of the plurality of clusters; and causing each cluster to copy each segment of the first memory assigned thereto to the corresponding segment of the second memory, to restore data coherency between the first and second memories.

10. A method according to claim 9, wherein the first and second memories are each divided into a number of segments equal to an integer multiple of the number of clusters, and each cluster is assigned at least one segment of the first memory.

11. A method according to claim 9, wherein, in the step of causing each cluster to copy each segment of the first memory assigned thereto, the clusters simultaneously copy the segments of the first memory to the corresponding segments of the second memory.

12. A method according to claim 9, wherein a respective cluster of the plurality of clusters detects the loss of data coherency between the first and second memories, and the cluster detecting the loss of data coherency performs said step of assigning the plurality of segments of the first memory to the plurality of clusters.

13. A method according to claim 9, further comprising the step of:

synchronizing the clusters to prevent the clusters from accessing the first and second memories for normal operations until after the plurality of segments of the first memory are copied to the corresponding segments of the second memory.

14. A method according to claim 13, further comprising the step of, after the plurality of segments of the first memory are copied to the corresponding segments of the second memory:

desynchronizing the clusters.

15. An apparatus for restoring data coherency between first and second memories which have lost data coherency, the first and second memories being accessible by a plurality of clusters, the apparatus comprising:

means for dividing the first and second memories into a plurality of segments, the plurality of segments of the first memory corresponding, respectively, to the plurality of segments of the second memory;

means for assigning each segment of the plurality of segments of the first memory to a respective cluster of the plurality of clusters; and means for causing each cluster to copy each segment of the first memory assigned thereto to the corresponding segment of the second memory, to restore data coherency between the first and second memories.

16. An apparatus comprising:

first and second memories which normally operate with data coherency but have lost data coherency;

a plurality of clusters which access the first and second memories; and a coherency restoration mechanism which restores coherency between the first and second memories by dividing the first and second memories into a plurality of segments, the plurality of segments of the first memory corresponding, respectively, to the plurality of segments of the second memory, assigning each segment of the plurality of segments of the first memory to a respective cluster of the plurality of clusters, and causing each cluster to copy each segment of the first memory assigned thereto to the corresponding segment of the second memory.

* * * * *